July 22, 1958 O. B. DUTTON 2,844,650

TELETYPE WRITER SYSTEMS OR THE LIKE

Filed March 2, 1954 3 Sheets-Sheet 1

OSCAR B. DUTTON
*INVENTOR.*

BY [signature]

HIS ATTORNEY

July 22, 1958 O. B. DUTTON 2,844,650

TELETYPE WRITER SYSTEMS OR THE LIKE

Filed March 2, 1954 3 Sheets-Sheet 2

OSCAR B. DUTTON
*INVENTOR.*

BY Bruce L. Birchard

HIS ATTORNEY

TELETYPE WRITER SYSTEMS OR THE LIKE

Filed March 2, 1954

3 Sheets-Sheet 3

OSCAR B. DUTTON
*INVENTOR.*

BY Bruce L. Birchard

HIS ATTORNEY

United States Patent Office 2,844,650

Patented July 22, 1958

2,844,650

TELETYPEWRITER SYSTEMS OR THE LIKE

Oscar B. Dutton, Redondo Beach, Calif., assignor to Hoffman Electronics Corporation, a corporation of California Application March 2, 1954, Serial No. 413,629

5 Claims. (Cl. 178—51)

This invention is related to teletypewriter systems for transmitting and receiving intelligence-bearing signals and more particularly, to an improved teletypewriter system which will exhibit greater reliability than teletypewriter systems presently in use.

In the past, many attempts have been made to design a satisfactory teletypewriter system which would exhibit optimum reliability under, and adaptability to, all operating conditions. Invariably these attempts have encountered certain problems which render teletypewriter systems heretofore designed deficient in some respect. For example, teletypewriter systems presently in use have but one message transmission speed, and hence the advantages of increased reliability in the reduction of message speed if transmission systems warrant such reduction are lost. Also, decoding in the receiving portion of these systems invariably is dependent upon the relative length of the character units, and thus error is introduced by the occurrence of pulse stretching in the presence of multipath transmission. And, in addition, the design of present teletypewriter systems requires synchronization of the receiver with the transmitter, thus affording a further source of probable error.

Therefore, it is an object of this invention to provide an improved teletypewriter system.

It is a further object of this invention to provide an improved teletypewriter system which will be completely non-synchronous, and also will exhibit optimum reliability under all operating conditions.

According to this invention, intelligence characters are encoded in the teletypewriter transmitter by using a combination of on-off keying and variation in the scanning rate of a definite number of frequency diversity channels. Decoding of the characters is accomplished in the teletypewriter receiver by detecting the diversity channel signals separately and sequentially feeding these signals through a common damped tuned-circuit to a series of counter-chain circuits. Presentation of the decoded signals may be accomplished by means of a drum, tape, and print bar, the drum having a simple binary coding system which relates angular position of the drum with the particular condition of the receiver counter-chain circuits, and consequently, with a particular character representation.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
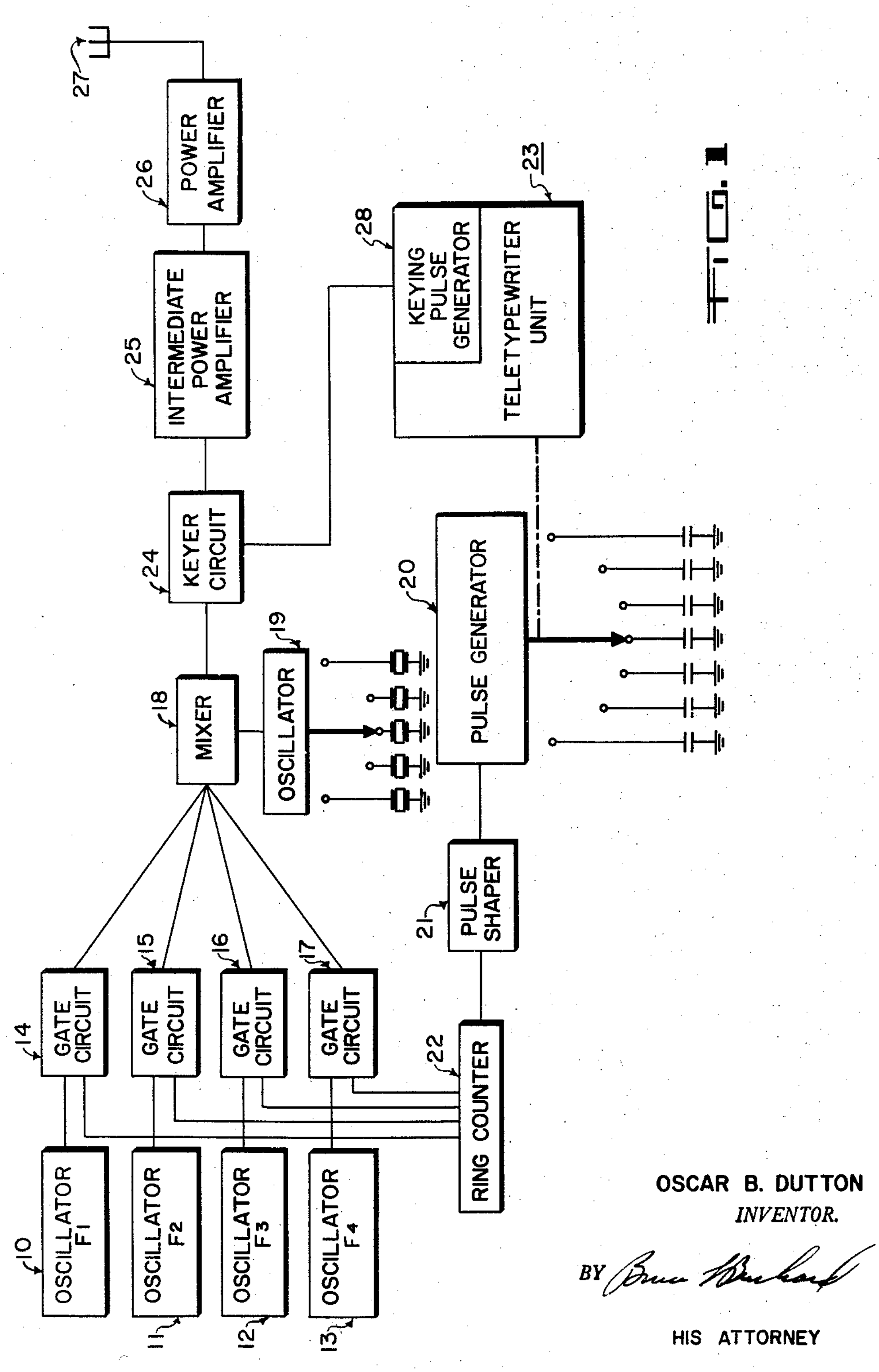
Figure 1 is a block diagram of a teletypewriter transmitter according to this invention.

In Figure 1, frequency diversity oscillators 10, 11, 12 and 13 are connected through gating circuits 14, 15, 16 and 17, respectively, to mixer 18, to which oscillator 19 is also connected. Oscillators 10, 11, 12, and 13 jointly supply four frequency diversity signals spaced, for example, two kilocycles apart, to be fed through their respective gating circuits to mixer 18 where these frequencies are combined individually and sequentially with the output frequency of crystal-controlled oscillator 19 so as to produce sum frequencies equal to the desired output frequencies. These output frequencies may be varied by the selection of different crystals to control oscillator 19. (Of course, any number of frequency diversity channels may be employed, rather than the four chosen for the present transmitter circuitry.) Generator 20, a gating pulse source of variable repetition rate, is connected through pulse shaper 21 to four-step ring counter 22, which in turn is connected to gate circuits 14, 15, 16 and 17. The nature of the pulses delivered by ring counter 22 is such that the four gating circuits are opened sequentially in a continuous cycling operation. To illustrate, each 1-millisecond square-wave pulse generated by one portion of ring counter 22 will be followed by a quiescent period of 3 milliseconds during which three 1-millisecond pulses are generated sequentially by other portions of the ring counter circuit. (All values herein given are for illustration purposes only.)

The keyboard of teletypewriter unit 23 has 49 keys which are divided into groups of seven, each group being electrically or mechanically connected to the circuitry of pulse generator 20 so that for each group of keys selected a different pulse repetition frequency will arise in generator 20, thereby varying the scanning rate of the frequency diversity oscillator gate circuits. Also, the depression of each key in each group of seven keys allows keying pulse generator 28 of teletypewriter unit 23 to send from one to seven mark pulses to keyer circuit 24, to overcome the bias of the keyer vacuum tube and thus allow the output signal of mixer 18 to be conducted through keyer stage 24. The output of keyer stage 24 is subsequently fed through intermediate power amplifier 25 and power amplifier 26 to transmitting antenna 27.

The circuit of Figure 1 operates as follows:

The frequency diversity signals from oscillators 10, 11, 12, and 13 are fed sequentially through their respective gating circuits to mixer stage 18, to which is also fed the output of crystal-controlled oscillator 19. When a teletypewriter key is depressed, one of seven scanning rates is selected to open sequentially the oscillator gate circuits. This is accomplished by changing the frequency of the pulse repetition frequency source, generator 20. Also, depression of the chosen teletypewriter key simultaneously sends a number of mark signals, ranging from one to seven, to the transmitter keying circuitry, keyer stage 24. These mark signals overcome the cut-off bias of the keyer vacuum tube, allowing this tube to conduct the output signal of mixer 18 and feed this signal through intermediate power amplifier 25 and power amplifier 26 to transmitting antenna 27.

It is seen that this method of teletypewriter transmission incorporates: conventional blocked-grid on-off keying to avoid undesirable transient phenomena; frequency diversity transmission to avoid the effects of selective fading; and a system of teletypewriter coding incorporating selection of one of seven frequency diversity signal scanning rates, and simultaneous selection of from one to seven mark pulses to control the keyer circuitry, for the identifying transmission of any one of forty-nine characters chosen. Of course neither the scanning rates nor the mark pulses are restricted to seven in number. The number of mark pulses and scannng rates are determined, of course, by the number of characters desired for transmission.

Figures 2, 3:
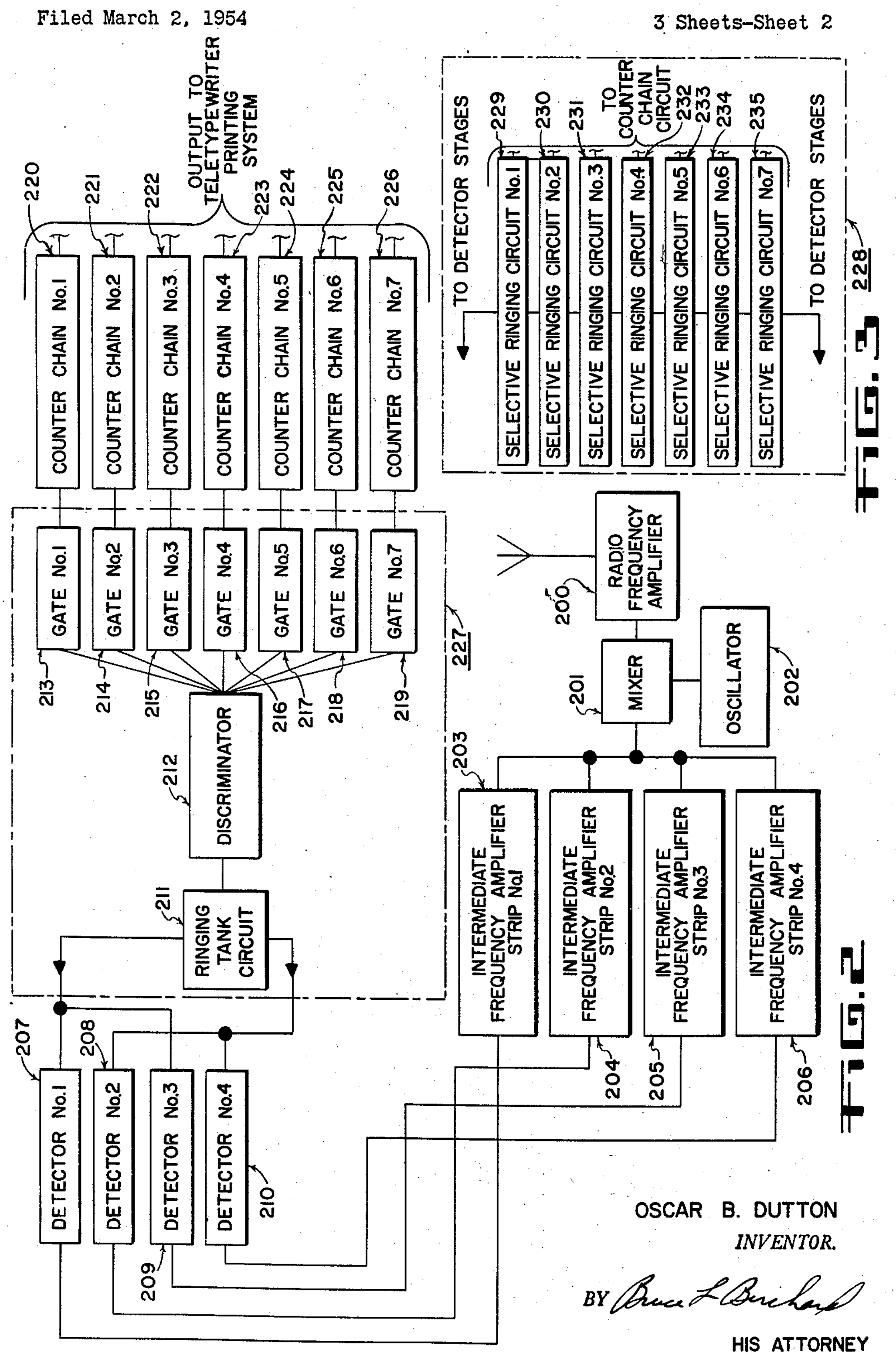
Figure 2 is a block diagram of a teletypewriter receiver according to this invention.
Figure 3 is an alternate form of a portion of the circuit of Figure 2.

In Figure 2, intelligence-bearing signals, if present, are intercepted by antenna 200 which is connected, in conventional manner, to mixer 201, to which oscillator 202 is also connected. The output of mixer 201 is fed through intermediate frequency amplifier strips 203, 204, 205 and 206, and through detector stages 207, 208, 209 and 210, respectively, to ringing tank circuit 211. Intermediate frequency amplifier strips 203, 204, 205 and 206 are sharply tuned to select and amplify separately the four frequency diversity signals. Respective detectors 207, 208, 209 and 210 of the frequency diversity receiver are alternately connected to either end of ringing tank circuit 211, as shown in Figure 2. Ringing tank circuit 211 is highly damped, being so chosen that it will faithfully respond to entire range of transmission scanning frequencies. Its nominal resonant frequency is equal to twice the output scanning frequency of the transmitter's four-step ring counter, and, correspondingly, one-half the mean repetition frequency of generator 20.

Ringing tank circuit 211 is coupled to discriminator 212, the output of which consists of D. C. voltage pulses, their magnitude and polarity being dependent upon the particular repetition rate of generator 20 at the transmitter. These voltages are fed to gate circuits 213, 214, 215, 216, 217, 218 and 219 which respond only to certain pre-set potentials of a definite polarity. Gate circuits 213, 214, 215, 216, 217, 218 and 219 are in turn connected respectively to conventional counter chain circuits 220, 221, 222, 223, 224, 225 and 226, which are capable of counting and storing up to seven mark signals. The counting circuits are so chosen as to respond only to the presence of signals, and not to depend upon the length of mark for their operation. This means that all but a small portion of the mark signal could be missed without failure of the counting system to record the proper count. The output signals from the counter chains are subsequently directed to the presentation system.

The circuit of Figure 2 operates as follows:

Incoming intelligence-bearing signals are intercepted by antenna 200 and fed to mixer 201, to be intermodulated with the output signal of oscillator 202. The output of mixer 201 is fed through intermediate frequency amplifier strips 203, 204, 205 and 206, and through detectors 207, 208, 209, and 210, respectively, to a common ringing tank circuit 211, which is responsive to the entire range of scanning frequencies of the teletypewriter transmitter. The output of tank circuit 211 is coupled to discriminator stage 212. Discriminator stage 212 produces D. C. output control voltages, the magnitude and polarity of which are dependent upon the transmitter scanning frequency being employed. The signal pulses of each scanning frequency are separately fed to their respective gating circuits, and then to their respective chain counters, the output signals of which are fed to the teletypewriter printing system for conversion into printed characters.

As an alternate approach, circuit 227 of Figure 3, composed of ringing tank circuit 211, discriminator 212, and gate circuits 213, 214, 215, 216, 217, 218, and 219 may be replaced by circuit 228, consisting of a plurality of series-connected conventional selective ringing circuits 229, 230, 231, 232, 233, 234, and 235 responsive to the various pulse repetition rates at the transmitter, these ringing circuits being individually coupled to the proper counter-chain circuit. Also, intermediate frequency amplifier strips 203, 204, 205, and 206 and detector stages 207, 208, 209, and 210 may be replaced by a single intermediate frequency amplifier strip and detector stage circuit which is responsive to the entire frequency diversity band.

Figure 4:
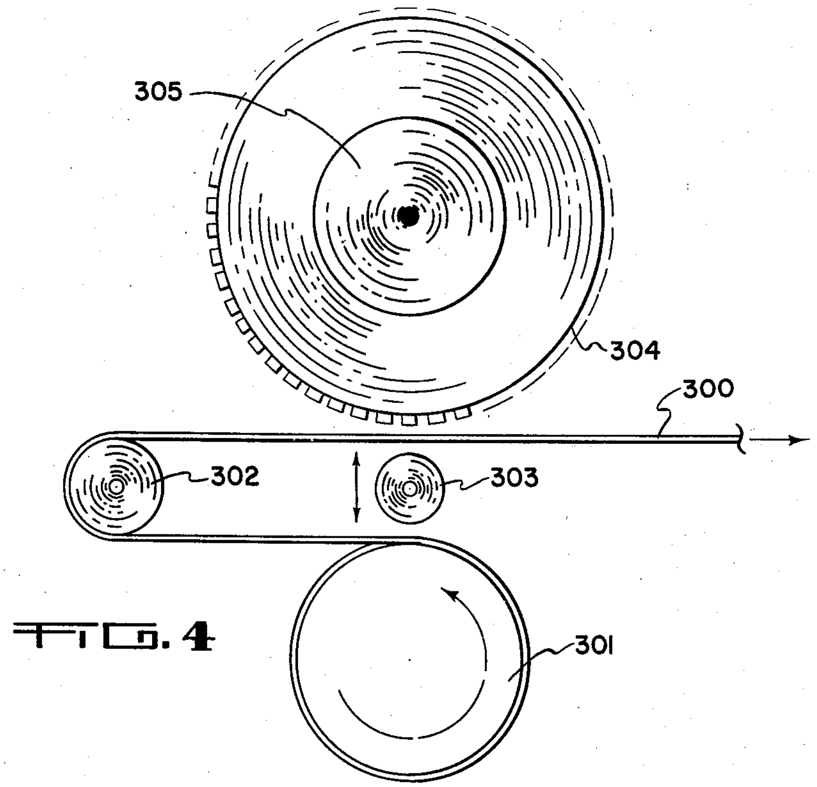
Figure 4 is an elevational view of a presentation system which may be employed with this invention.
Figure 5:
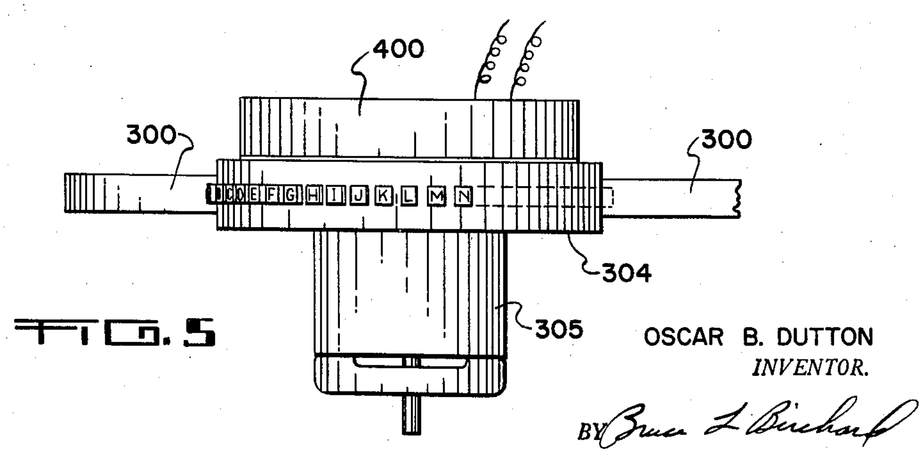
Figure 5 is the top plan view of a presentation system of Figure 3.

In Figures 4, and 5, tape 300 unrolls from tape storage roll 301 and passes over roller 302 until it is in a position directly between print bar 303 and the lower portion of character drum 304, which is driven by motor 305. Binary commutating system 400 uniquely determines the angular position of character drum 304 so that a particular impulse from the teletypewriter receiver will determine which of the several characters on the periphery of drum 304 will be positioned exactly above tape 300, so that when print bar 303 moves upward this letter will be printed on tape 300.

The presentation system described in Figures 4 and 5 operates as follows:

It has been heretofore explained that each intelligence character transmtted is unique, having a particular number of mark pulses (for example, one to seven) and a particular pulse repetition rate (for example, one of seven rates). Character drum 304 is driven by motor 305 at a constant speed, this speed being such that the drum rotates one complete revolution in a shorter period of time than would be required to transmit one letter when the transmitter is operating at the maximum possible keying speed. Binary commutating system 400 is a device which relates the drum position to the condition of the counter circuits in the decoder portion of the receiver. The counters and the receiver decoder are operated in such a manner that the steady state condition after receiving a character will match one, and only one, condition of the binary segments of the character drum. This information will have been stored in the particular counter until such time as the position of the drum is properly related to condition of the counter and that of the binary commutating system. At that time, an actuating circuit will be completed and the printer will be given a command signal to print. At the instant of printing, the desired character will be directly above tape 300, print bar 303 will rise, print the character, and fall again. The action of print bar 303 will also cause the tape to be advanced one position and the counters to be reset to the zero or start condition in preparation for another character.

The completed system would, of course, incorporate a combination transmitting keyboard and printer. This would permit transmission and reception on the same machine, and also permit the operator to have a record of the message he was transmitting much in the same fashion as is possible with the standard teletypwriter machine.

While particular embodiments of the present invention have been shown and described, it will be obvious to those skilled in the art that changes and modifications may be made without departing from this invention in its broader aspects, and therefore, the aim of the appended claims is to cover all such changes and modifications as fall within the true spirit and scope of this invention.

I claim:

1. A teletypewriter transmitter including an exciter unit, said exciter unit being constructed to provide a signal varying in frequency in discrete steps over a predetermined range of frequencies at a controllable rate; a teletypwriter unit including an instrument and a keying pulse generator, said instrument including a keyboard; means coupling said instrument to said exciter unit to control said rate of variation in frequency of said signal; means coupling said instrument to said keying pulse generator for activating said keying pulse generator during predetermined intervals controlled by said keyboard upon operation thereof; means for disseminating the signal from said exciter unit; and a keying gate circuit interposed between said exciter unit and said disseminating means and coupled to said keying pulse generator for controlling the dissemination of said signal from said exciter unit in accordance with the particular mode of operation of said keyboard.

2. A teletypewriter transmitter comprising, in combination, a first pulse generator having an output circuit and means for varying the pulse repetition frequency, a pulse shaper having an input circuit and an output circuit, and a ring counter having an input circuit and a plurality of output circuits, said output circuit of said first pulse generator being connected to said input circuit of said pulse shaper, and said output circuit of said pulse shaper being connected to said input circuit of said ring counter; a plurality of oscillators tuned to spaced frequencies in a range of frequencies, and a plurality of gate circuits each having a first input circuit, a second input circuit, and an output circuit, each of said oscillators being connected to one of said first input circuits of said gate circuits, and each of said output circuits of said ring counter being connected to one of said second input circuits of said gate circuits; a keyer circuit having a first input circuit, a second input circuit, and an output circuit, and a teletypewriter unit having a keying pulse generator, said output circuits of said gate circuits being coupled to said first input circuit of said keyer circuit, said keying pulse generator of said teletypewriter unit being connected to said second input circuit of said keyer circuit, and said teletypewriter unit being coupled to said frequency variation means of said first pulse generator; a power amplifier stage, and signal disseminating means, said output circuit of said keyer circuit being connected through said power amplifier stage to said signal disseminating means.

3. A teletypewriter transmitter comprising, in combination, a first pulse generator having an output circuit and means for varying the pulse repetition frequency, a pulse shaper having an input circuit and an output circuit, and a ring counter having an input circuit and a plurality of output circuits, said output circuit of said first pulse generator being connected to said input circuit of said pulse shaper, and said output circuit of said pulse shaper being connected to said input circuit of said ring counter; a plurality of oscillators tuned to spaced frequencies in a range of frequencies, and a plurality of gate circuits each having a first input circuit, a second input circuit, and an output circuit, each of said oscillators being connected to one of said first input circuits of said gate circuits, and each of said output circuits of said ring counter being connected to one of said second input circuits of said gate circuits; a keyer circuit having a first input circuit, a second input circuit, and an output circuit, and a teletypewriter unit having a keying pulse generator, said output circuits of said gate circuits being coupled to said first input circuit of said keyer circuit, said keying pulse generator of said teletypewriter unit being connected to said second input circuit of said keyer circuit and said teletypewriter unit being connected mechanically to said frequency variation means of said first pulse generator; a power amplifier stage, and signal disseminating means, said output circuit of said keyer circuit being connected through said power amplifier stage to said signal disseminating means.

4. A teletypewriter transmitter comprising, in combination, a first pulse generator having an output circuit and means for varying the pulse repetition frequency, a pulse shaper having an input circuit and an output circuit, and a ring counter having an input circuit and a plurality of output circuits, said output circuit of said first pulse generator being connected to said input circuit of said pulse shaper, and said output circuit of said pulse shaper being connected to said input circuit of said ring counter; a plurality of oscillators tuned to spaced frequencies in a range of frequencies, and a plurality of gate circuits each having a first input circuit, a second input circuit, and an output circuit, each of said oscillators being connected to one of said first input circuits of said gate circuits, and each of said output circuits of said ring counter being connected to one of said second input circuits of said gate circuits; a keyer circuit having a first input circuit, a second input circuit, and an output circuit, and a teletypewriter unit having a keying pulse generator, said output circuits of said gate circuits being coupled to said first input circuit of said keyer circuit, said keying pulse generator of said teletypewriter unit being connected to said second input circuit of said keyer circuit and said teletypewriter unit being connected electrically to said frequency variation means of said first pulse generator; a power amplifier stage, and signal disseminating means, said output circuit of said keyer circuit being connected through said power amplifier stage to said signal disseminating means.

5. A teletypewriter transmitter comprising, in combination, a first pulse generator having an output circuit and means for varying the pulse repetition frequency, a pulse shaper having an input circuit and an output circuit, and a ring counter having an input circuit and a plurality of output circuits, said output circuit of said first generator being connected to said input circuit of said pulse shaper, and said output circuit of said pulse shaper being connected to said input circuit of said ring counter; a plurality of oscillators tuned to spaced frequencies in a range of frequencies, and a plurality of gate circuits each having a first input circuit, a second input circuit, and an output circuit, each of said oscillators being connected to one of said first input circuits of said gate circuits, and each of said output circuits of said ring counter being connected to one of said second input circuits of one of said gate circuits; a mixer stage having a first input circuit, a second input circuit, and an output circuit, and a beat frequency oscillator, said output circuit of each of said gate circuits being connected to said first input circuit of said mixer stage, and said beat frequency oscillator being connected to said second input circuit of said mixer stage; a keyer circuit having a first input circuit, a second input circuit, and an output circuit, and a teletypewriter unit having a keying pulse generator, said output circuit of said mixer stage being coupled to said first input circuit of said keyer circuit, said keying pulse generator of said teletypewriter unit being connected to said second input circuit of said keyer circuit, and said teletypewriter unit being coupled to said frequency variation means of said first pulse generator; an intermediate power amplifier stage, a power amplifier stage, and signal dissemination means, said output circuit of said keyer circuit being connected through said intermediate power amplifier stage and through said power amplifier stage to said dissemination means.

References Cited in the file of this patent

UNITED STATES PATENTS

| | | |
|---|---|---|
| 902,792 | Agrell | Nov. 3, 1908 |
| 2,249,040 | Potts | July 15, 1941 |
| 2,615,984 | Lenehan | Oct. 28, 1952 |
| 2,654,801 | Atwood | Oct. 6, 1953 |
| 2,668,283 | Mullin | Feb. 2, 1954 |
| 2,668,870 | Ridler | Feb. 9, 1954 |